Aug. 11, 1964  E. A. ROESKE  3,143,858
HYDROSTATIC TRANSMISSION
Filed Feb. 19, 1963  3 Sheets-Sheet 1

Inventor:
Eugene A. Roeske
By: Robert L. Zieg Atty.

Aug. 11, 1964  E. A. ROESKE  3,143,858
HYDROSTATIC TRANSMISSION
Filed Feb. 19, 1963  3 Sheets-Sheet 2

Inventor:
Eugene A. Roeske
By: Robert L. Zieg Atty.

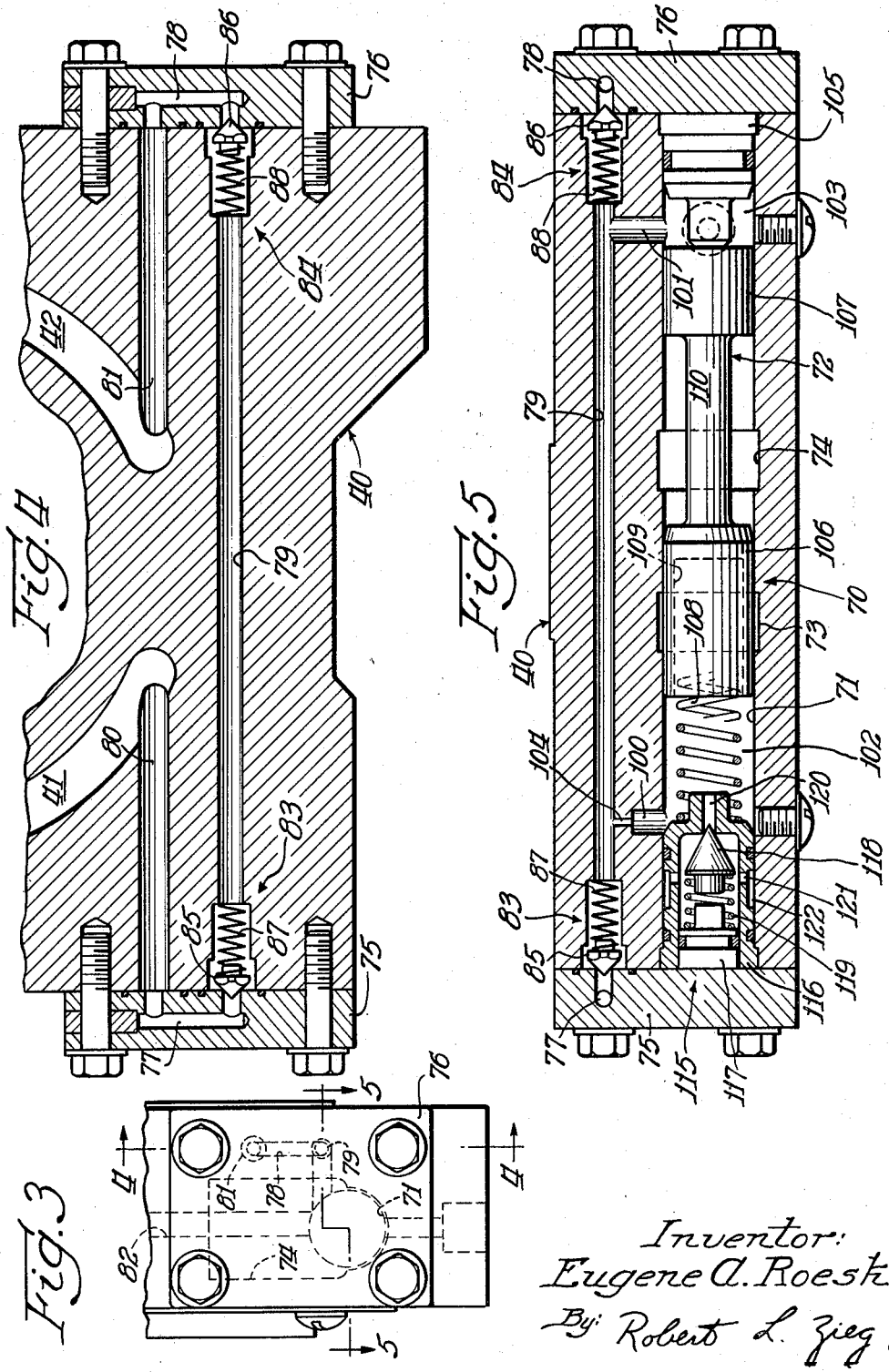

United States Patent Office 3,143,858
Patented Aug. 11, 1964

3,143,858
HYDROSTATIC TRANSMISSION
Eugene A. Roeske, Des Plaines, Ill., assignor to Borg-Warner Corporation, Chicago, Ill., a corporation of Illinois
Filed Feb. 19, 1963, Ser. No. 259,499
4 Claims. (Cl. 60—53)

This invention relates to a transmission mechanism, particularly suitable for automotive vehicles and the like, of the type comprising a fluid pump and a fluid motor.

The invention is more particularly concerned with a pilot-operated fluid pressure relief valve to limit the fluid pressure developed with the transmission.

The object of this invention is to provide a simply constructed pressure relief valve of the pilot-operated type to prevent pressures beyond a desired limit from being developed in the transmission. The pressure relief valve of this invention is connected in such a manner to the pressure ports interconnecting the fluid pump and motor so that the valve will limit the pressure developed regardless of which of the ports is the high pressure port.

Further objects and advantages of the present invention will be apparent in the following description, reference being made to the accompanying drawings wherein a preferred form of the present invention is shown.

In the drawings:

FIG. 3 is a fragmentary elevational view taken along the line 3—3 of FIG. 2;

FIG. 4 is a sectional view taken along the line 4—4 of FIG. 3;

FIG. 5 is a sectional view taken along the line 5—5 of FIG. 3 and illustrating the relief valve of the present invention.

Figure 1:
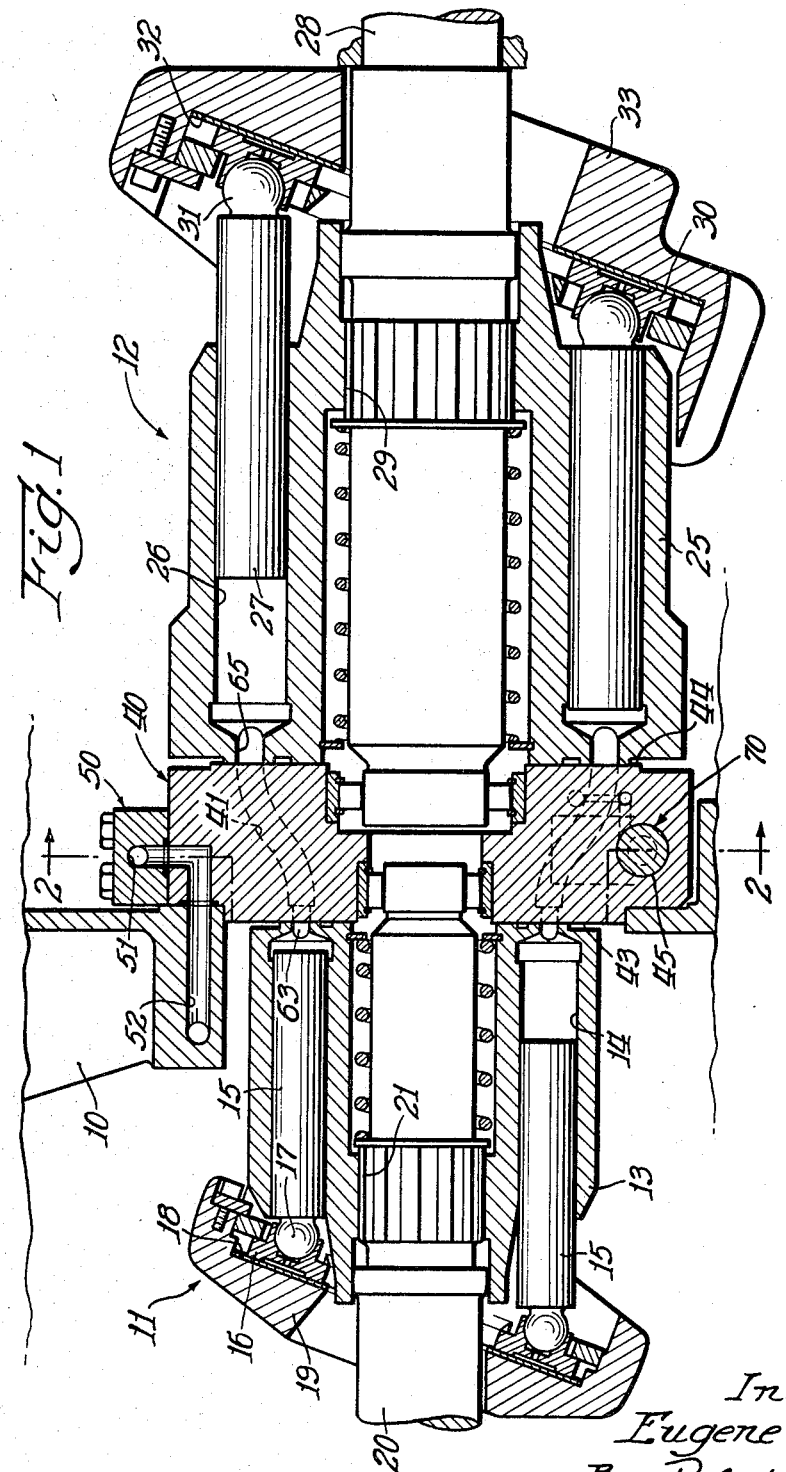
FIG. 1 is a longitudinal sectional view taken through a hydrostatic transmission embodying the pressure relief valve of the present invention.

Referring now to FIG. 1, there is shown a transmission of the type generally termed a hydrostatic transmission mounted in a stationary case 10 (partially illustrated). The transmission comprises a fluid pump 11 of the axial piston type and a fluid motor 12 of the axial piston type.

The fluid pump 11 comprises a cylinder block 13 having cylinders 14 and pistons 15 mounted within the cylinders. The pistons 15 of the fluid pump have shoes 16 mounted on spherical head portions 17 of the pistons. The shoes slide against the inclined surface 18 of a pivotable swash plate 19 when the pump is in operation. The input shaft 20, adapted to be driven by the engine of a vehicle, is splined to pump cylinder block 13 at 21 to rotate the cylinder block and produce a fluid pumping action.

The fluid motor 12 comprises a cylinder block 25 having cylinders 26 and pistons 27 mounted within the cylinders. The cylinder block 25 is splined to the output shaft 28 at 29. Output shaft 28 is adapted to be connected to the driving wheels of a vehicle. The pistons 27 have shoes 30 mounted on the spherical head portions 31 which slide on the inclined surface 32 of the swash plate 33. The swash plate 33 is held against rotation to act as a reaction member for the pistons 27.

A stationary port plate 40 fixed to case 10 is provided between the fluid pump and motor. The port plate has two fluid passages 41 and 42 (shown in FIG. 2) interconnecting the pump and motor. The port plate 40 has a surface 43 in engagement with cylinder block 13 and a surface 44 in engagement with cylinder block 25.

Depending upon the direction of rotation of the motor unit and whether the engine is driving the wheels through the output shaft or the wheels are attempting to drive the engine in a coast condition, one of the passages 41 or 42 will be a high pressure passage, carrying fluid under pressure from the pump to the motor unit and the other will be a low pressure passage returning low pressure fluid from the motor to the pump.

Figure 2:
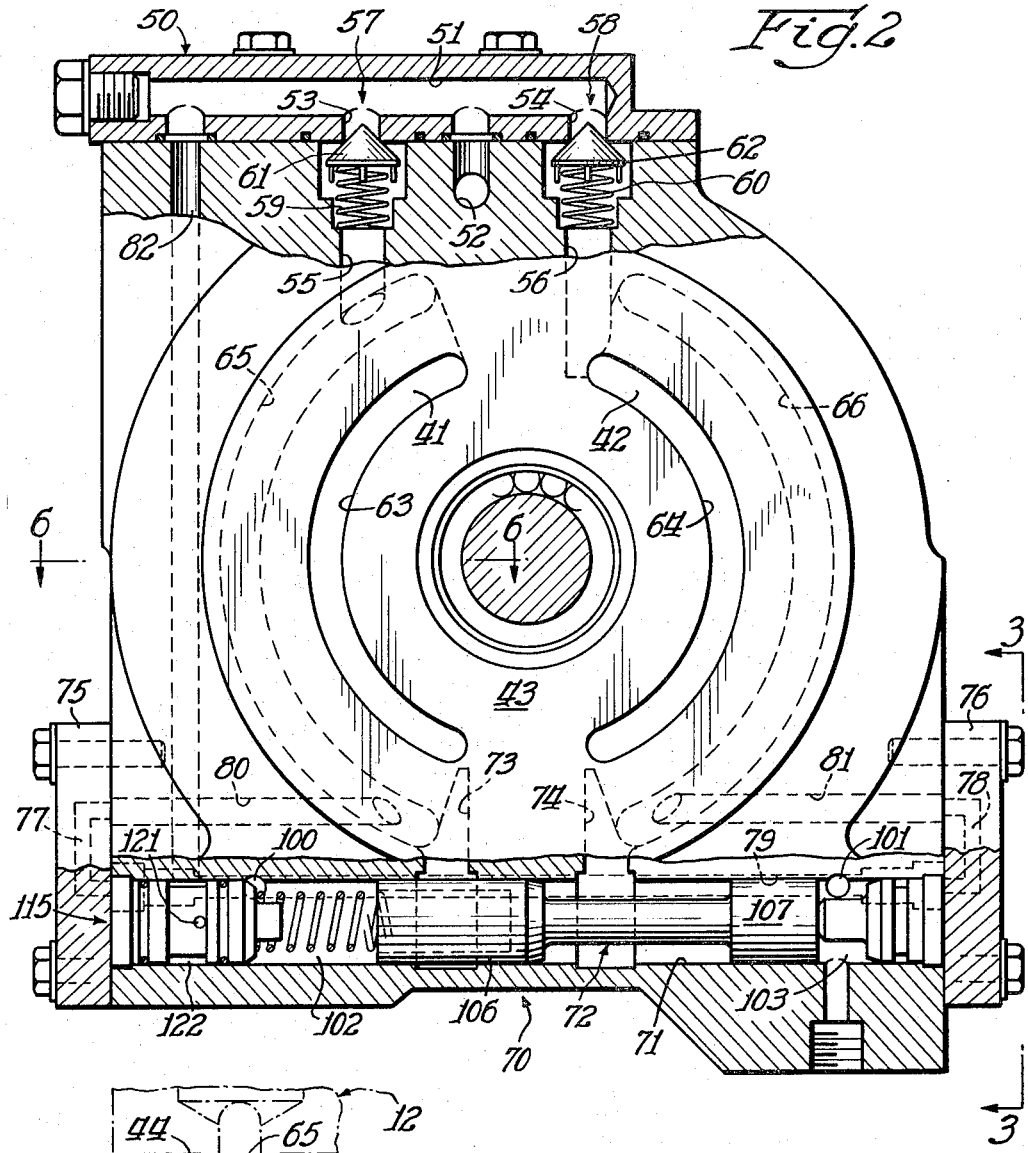
FIG. 2 is a partial sectional view taken along the lines 2—2 of FIG. 1.

The pressure relief valve 70 of the present invention is mounted within the port plate 40 at 45 and is more particularly illustrated in FIGS. 2 and 5. The lower portion of port plate 40 acts as the valve body for the pressure relief valve 70.

In FIG. 2 the fluid charge system and the pressure relief valve are illustrated. The transmission charge system supplies fluid to the pump and motor units to replace fluid lost in the transmission by leakage or otherwise.

A top plate 50 is attached to the port plate and has a passage 51 therein which supplies fluid pressure from the fluid pressure charge pump (not illustrated) to the pump and motor units, as needed. Fluid pressure is communicated to the passage 51 from the passage 52 which may be connected to the charge pump. The top plate 50 has two openings 53 and 54 connecting passage 51 to passages 55 and 56 in the port plate 40. Check valves 57 and 58 are provided in the passages 55 and 56 in the port plate. The check valves 57 and 58 comprise springs 59 and 60 and conical members 61 and 62, respectively. The conical members are urged to a closed position engaging openings 53 and 54 by the springs. The passages 55 and 56 communicate with the passages 41 and 42 interconnecting the pump and motor units.

The passage 41 has a port 63 and the passage 42 has a port 64 in the surface 43 on the pump side of the port plate 40. The passage 41 has a port 65 and the passage 42 has a port 66 in the surface 44 on the motor side of the port plate 40.

The lower portion of port plate 40 has a bore 71 therein. The valve spool 72 of the relief valve 70 is mounted in the bore 71. Passages 73 and 74 are provided to communicate fluid from the passages 41 and 42 to the relief valve. End plates 75 and 76 are provided which have passages 77 and 78 respectively therein. A passage 79 is provided in the port plate 40 which communicates with the passages 77 and 78. The passage 77 in end plate 75 also communicates with the passage 80 in the port plate. Passage 78 in end plate 76 also communicates with the passage 81 in the port plate. The passage 82 communicates with the left-hand end of bore 71 and the passage 51 in top plate 50.

In FIG. 4, the passages for supplying fluid pressure to the relief valve 70 are more clearly shown. Check valves 83 and 84 are mounted in either end of the passage 79. The check valves 83 and 84 comprise conical members 85 and 86 and springs 87 and 88, respectively. The springs urge the conical members to a position closing the openings between the passage 79 and passages 77 and 78.

In FIG. 5, the relief valve 70 of the present invention is clearly illustrated. As will be clear from the following discussion, the relief valve 70 provides pressure regulation with substantially less flow than that occurring within passages 41 and 42 of the transmission, and the pressure regulating function is performed utilizing only the single valve 70.

Referring to FIG. 5, connected to the passage 79 are openings 100 and 101 which communicate with cavities 102 and 103 of the relief valve 70, respectively. The opening 100 has a restriction 104 therein.

The relief valve 70 comprises an end plug 105, valve spool 72 with lands 106 and 107 thereon separated by a reduced portion 110, and a spring 108 which urges the valve spool to the right as illustrated in FIG. 5. The spring 108 fits in a recess 109 in the valve spool.

A pilot valve 115 is provided at the left-hand end of the bore 71. The pilot valve comprises a housing 116, end plug 117, a conical member 118, and a spring 119 urging the conical member to the right to engage and close the bore 120. The housing 116 is provided with bores 121 therein which communicate with a groove 122. The groove 122 is in communication with passage 82 to exhaust fluid into the charge system as seen in FIG. 2.

As mentioned above in the description of FIG. 2, passages 73 and 74 interconnect the valve bore 71 to the passages 41 and 42.

Figure 6:
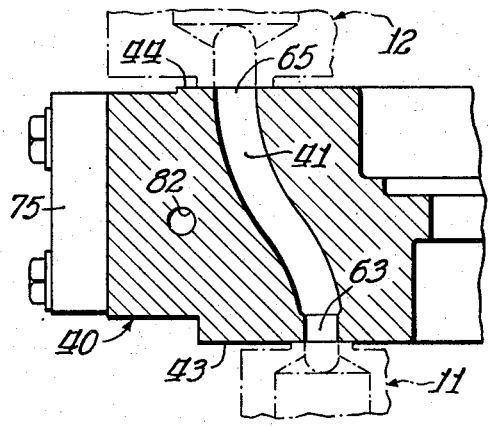
FIG. 6 is a sectional view along the line 6—6 of FIG. 2.

In FIG. 6, the general shape of the pressure ports is illustrated by a sectional view through the port plate 40 showing passage 41.

The operation of the transmission is as follows: the engine of the vehicle turns input shaft 21 rotating cylinder block 13 of pump 11 thereby reciprocating pistons 15. Fluid pressure created by movement of the pistons is delivered into one of the passages 41 or 42 and returned from the motor unit through the other passage. Fluid pressure is communicated by the passage 41 or 42 through the port plate 40 into the cylinders 26 and acts on the left-hand side of the pistons 27 to urge the pistons to the right as seen in FIG. 2. Reaction of the pistons pushing against the inclined surface 32 of the swash plate 33 rotates the cylinder block 25 and thereby the output shaft 28. The swash plate 19 of the pump unit can be pivoted to change the amount of fluid pumped by the pump unit and also the path of the fluid pumped. By varying the angle of the swash plate 19, various transmission ratios can be produced depending upon the volume of fluid pumped; and forward or reverse drive of the output shaft 28 is available by changing the path of flow of the fluid pumped.

Assuming passage 41 is the high pressure passage at a given time, the high pressure fluid will enter passage 79 through check valve 83. High pressure fluid in passage 79 will close the other check valve 84, and this will prevent escape of the high pressure fluid to the low pressure passage 42.

High pressure fluid in passage 79 is communicated through openings 100 and 101 to the cavities 102 and 103 at each end of the valve bore 71. In this way, equal fluid pressure is acting on the outer surfaces of the lands 106 and 107 on the valve spool 72, and the valve spool is balanced with regard to fluid pressure and will remain in the position as shown in FIG. 5 due to the bias of spring 108.

When a predetermined fluid pressure is reached within the cavity 102, the conical member 118 of the pilot valve will move away from the bore 120 and exaust fluid pressure through the bores 121 into the charge system through passage 82. Due to the flow through the pilot valve and across the restriction 104 in the opening 100, a decrease in pressure occurs in cavity 102. A pressure unbalance is thus created which overcomes the bias of spring 108 and moves the valve spool 72 to a position in which passages 73 and 74 will be interconnected.

When passages 73 and 74 are interconnected, the high pressure passage 41 of the transmission is connected to the low pressure passage 42 and thus the fluid pressure will be prevented from increasing further. When the load is reduced on the transmission to decrease the fluid pressure to the desired maximum, the spring 119 will return the conical member 118 to close bore 120 and the fluid pressure acting on the valve spool will be balanced since there is no flow across the restriction 104 and no corresponding pressure decrease. With the fluid pressure balanced, the spring 108 will return the valve spool 72 to the position illustrated in FIG. 5.

From the above, the advantages of the relief valve of the present invention will be obvious. Through the use of the fluid passage 79 in connection with the check valves 83 and 84, it is possible to use only the single valve 70 to regulate the fluid pressure regardless of which of the passages 41 or 42 in the port plate is the high pressure passage. By the use of the pilot-operated relief valve in connection with the fluid restriction, only a slight fluid flow (substantially less than that existing in the passages 41 and 42) is necessary to operate the relief valve. Since pressure regulation is performed with low flow rates, this type of valve allows the use of light springs and small passages, and is very stable and accurate in holding the pressure at a constant value.

I wish it to be understood that my invention is not to be limited to the specific constructions and arrangements shown and described, except only insofar as the claims may be so limited, as it will be understood by those skilled in the art that changes may be made without departing from the principles of the invention.

I claim:

1. In a hydrostatic transmission including a fluid pump hydraulically connected to a fluid motor wherein the pump is adapted to be connected to a power source and the motor is adapted to be connected to a drive a load, at least two fluid passageways interconnecting said pump and motor, one of said passageways being a high pressure passageway and the other a low pressure passageway, a pressure relief valve operative to prevent pressures beyond a predetermined maximum from being developed in said passageways comprising a body having a bore therein and a valve spool slidable within said bore, a pair of fluid passages each communicating with one of said passageways and with said bore, biasing means in said bore urging said valve spool to a position in which fluid flow between said pair of passages is blocked, a fluid passage connected to said two passageways to supply fluid pressure from the high pressure passageway to both ends of said bore, means adapted to exhaust fluid from said one end of said bore when a predetermined fluid pressure is reached within said one end, means to restrict fluid flow from said fluid passage into one end of said bore, said flow restricting means producing a pressure unbalance between the ends of said bore when fluid is exhausted from said one end of the bore and thereby moving said valve spool to interconnect said pair of fluid passages and regulate the fluid pressure developed to a predetermined maximum, said fluid exhausting means and said flow restricting means providing fluid pressure regulation with substantially less fluid flow than existing in said two passageways.

2. A transmission as claimed in claim 1 wherein said fluid passage has a check valve at each end thereof between the fluid passage and said two passageways, said check valves being operative to admit fluid pressure from whichever of said two passageways is the high pressure passageway into the fluid passage and prevent escape of fluid pressure from said fluid passage into whichever of said two passageways is the low pressure passageway.

3. A transmission as claimed in claim 1 wherein a pilot valve is provided to exhaust fluid from said one end of said bore when a predetermined fluid pressure is reached, said pilot valve including a spring-urged member and an exhaust bore, said spring urged member normally closing said exhaust bore.

4. In a hydrostatic transmission including a fluid pump hydraulically connected to a fluid motor wherein the pump is adapted to be driven by a power source and the motor is adapted to drive a load, two fluid carrying passageways interconnecting said pump and motor, one of said passageways being a high pressure passageway and the other a low pressure passageway depending upon the direction of rotation of the fluid motor and upon the load imposed upon the transmission, a pressure relief valve operative to prevent pressures beyond a predetermined maximum from being developed in said passageways comprising a body having a bore therein and a valve spool with two lands thereon slidable within said bore, a pair of fluid passages each communicating with one of said two passageways and with said bore, a spring within said bore urging said valve spool to a position in which fluid flow between said pair of passages is blocked by one of said lands, a fluid passage connected to each of said two passageways to supply fluid pressure from whichever of the passageways is the high pressure passageway to each end of said bore, means within said fluid passage to admit said high pressure fluid and to prevent escape of said fluid from the fluid passage into the low pressure passageway, an exhaust bore in said valve body at one end thereof, a pilot valve mounted in said body at said one end thereof including a spring biased member normally closing said exhaust bore, said member being adapted to move away from said exhaust bore and exhaust fluid from said one end of said bore when a predetermined fluid pressure is reached, a fluid flow restriction within said fluid passage to restrict fluid flow into said one end of said bore, said flow restricting means producing a pressure unbalance upon the ends of said valve spool when fluid is exhausted from said one end of said bore and thereby moving said valve spool to interconnect said pair of fluid passages and prevent a pressure build-up beyond a predetermined maximum.

No references cited.